United States Patent
Fanghaenel et al.

(10) Patent No.: US 11,386,065 B2
(45) Date of Patent: Jul. 12, 2022

(54) DATABASE CONCURRENCY CONTROL THROUGH HASH-BUCKET LATCHING

(71) Applicant: salesforce.com, inc., San Francisco, CA (US)

(72) Inventors: Thomas Fanghaenel, Oakland, CA (US); Patrick James Helland, San Francisco, CA (US); James E. Mace, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 309 days.

(21) Appl. No.: 15/420,377

(22) Filed: Jan. 31, 2017

(65) Prior Publication Data

US 2018/0218023 A1  Aug. 2, 2018

(51) Int. Cl.
*G06F 16/23* (2019.01)
*G06F 16/22* (2019.01)

(52) U.S. Cl.
CPC ...... *G06F 16/2343* (2019.01); *G06F 16/2255* (2019.01)

(58) Field of Classification Search
CPC ........... G06F 17/30362; G06F 17/3033; G06F 16/2343; G06F 16/2255
See application file for complete search history.

(56) References Cited

U.S. PATENT DOCUMENTS

| | | | |
|---|---|---|---|
| 5,276,868 A | | 1/1994 | Poole |
| 5,561,797 A | * | 10/1996 | Gilles ..................... G06F 9/466 |
| 5,664,179 A | | 9/1997 | Tucker |
| 6,665,682 B1 | * | 12/2003 | DeKimpe ......... G06F 17/30592 |
| 7,257,711 B2 | | 8/2007 | Goodrich et al. |
| 8,332,420 B2 | | 12/2012 | Kaiser |
| 2003/0041280 A1 | | 2/2003 | Malcolm et al. |
| 2003/0204698 A1 | * | 10/2003 | Sachedina ........... G06F 12/0806 711/170 |
| 2004/0107346 A1 | | 6/2004 | Goodrich et al. |
| 2005/0108255 A1 | * | 5/2005 | Alves ...................... G06F 9/466 |
| 2005/0144171 A1 | * | 6/2005 | Robinson ................ G06F 9/466 |
| 2007/0124313 A1 | * | 5/2007 | Kim ........................ G06F 21/10 |
| 2008/0021908 A1 | | 1/2008 | Trask et al. |
| 2008/0086501 A1 | * | 4/2008 | Levine .............. G06F 17/30569 |
| 2009/0132563 A1 | * | 5/2009 | Herlihy ............ G06F 17/30958 |
| 2011/0252000 A1 | | 10/2011 | Diaconu et al. |
| 2013/0173908 A1 | | 7/2013 | Matthews et al. |

(Continued)

*Primary Examiner* — Hosain T Alam
*Assistant Examiner* — Anthony G Gemignani
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to efficiently processing of concurrent database transactions. In one embodiment, a database system receives a first key-value pair for a database transaction and stores the key-value pair in a data structure for active database transactions. The storing may include indexing into a hash table of the data structure with a key of the key-value pair to identify a hash bucket of the hash table corresponding to the key, acquiring a latch associated with the identified hash bucket, and, based on a state of the acquired latch, appending, to the hash bucket, a record specifying the key-value pair. The database system may cause the key-value pair from the data structure to be committed to persistent storage in response to the database transaction being committed.

19 Claims, 8 Drawing Sheets

(56) References Cited

U.S. PATENT DOCUMENTS

2015/0278281 A1* 10/2015 Zhang ................. G06F 16/2246
707/703
2016/0044143 A1*  2/2016 Narasimhamurthy .. H04L 69/16
709/213
2016/0350006 A1* 12/2016 Wang ................... G06F 3/0608

* cited by examiner

DATABASE CONCURRENCY CONTROL THROUGH HASH-BUCKET LATCHING

BACKGROUND

Technical Field

This disclosure relates generally to database storage, and, more specifically, to processing concurrent database transactions for a database system.

Description of the Related Art

Companies typically rely on large database systems to manage their information. In many instances, these database systems may need to process large volumes of database transactions, which may be received concurrently. For example, a bank may maintain a database storing account balances for various customers and frequently need to process adjustments of those balances as customers deposit and withdraw funds.

In order to ensure that information is stored correctly, database transactions may be processed atomically and in an isolated manner. For example, if a customer is transferring funds from a savings account to a checking account, a database transaction may be received to adjust the balance of the saving account and adjust the balance of the checking account. Both of these adjustments need to be performed together as one unit (i.e., atomically) in order to reflect the correct amounts of funds. If only one adjustment occurs and the other fails to complete, the balances may show that a customer has more or less money than in actuality. Still further, if another transaction is received to read both account balances, this transaction may need to be performed in isolation from the balance-adjustment transaction because reading the balances while the balances are being adjusted can result in erroneous information being read if the read occurs after one adjustment but before the other.

Figure 1:
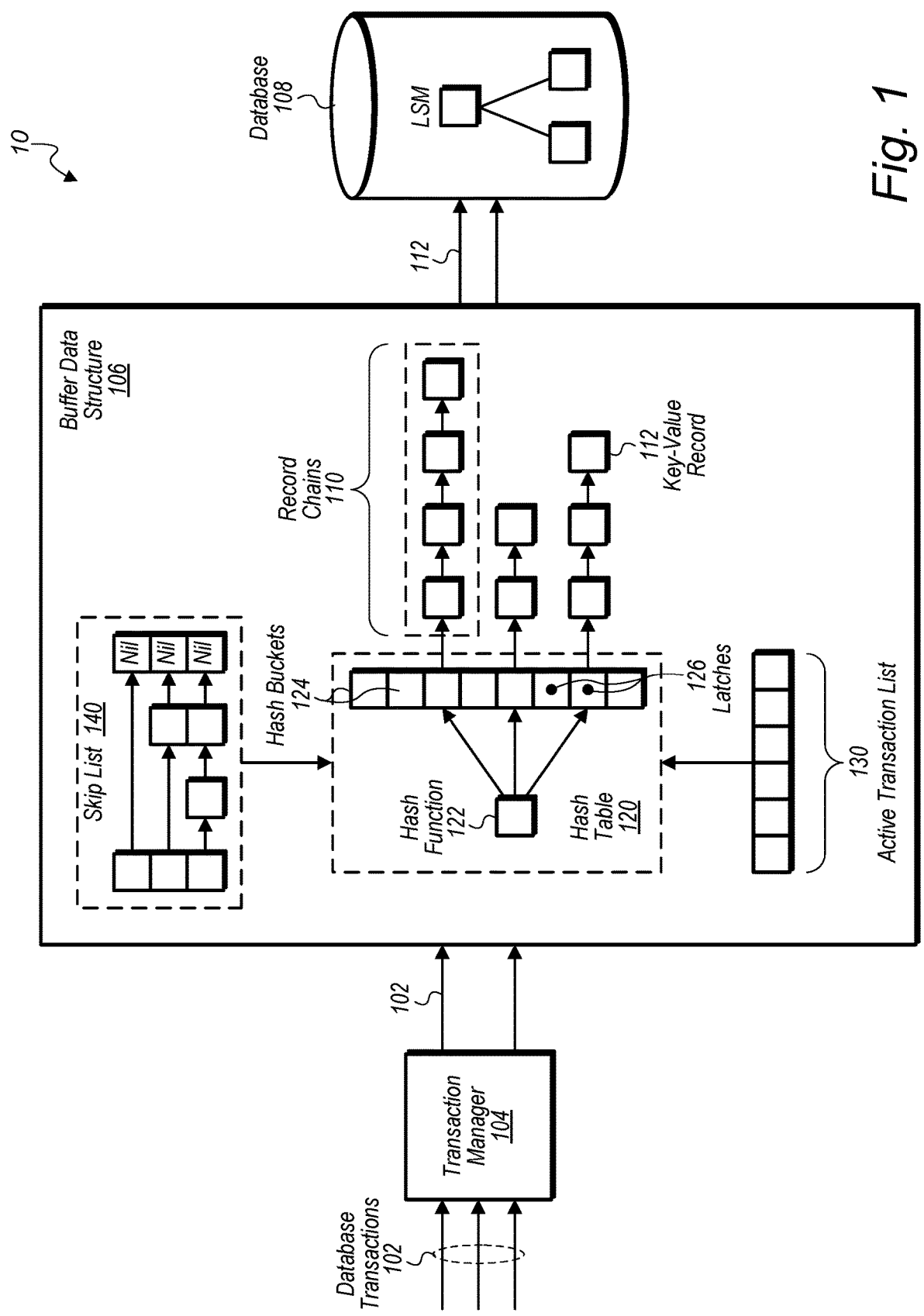
FIG. 1 is a block diagram illustrating one embodiment of a database system that uses a buffer data structure having hash-bucket latches to process concurrent database transactions.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "database system configured to implement a database" is intended to cover, for example, one or more computer systems that perform this function during operation, even if the computer systems in question are not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a database system may receive multiple database transactions including a first database transaction and a second database transaction. The "first" and "second" database transactions can be used to refer to any two of database transactions. In other words, the "first" and "second" database transactions are not limited to the initial two database transactions processed by the system.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Ensuring atomicity and isolation for database transactions can be particularly difficult when a database system handles high volumes of potentially concurrent transactions. As will be described below in further detail, the present disclosure describes embodiments in which a buffer data structure is used by a database system to store data of active database transactions until the database transactions can be committed and their data flushed to a persistent storage of the database system. (As used herein, the phrase "active database transaction" refers to database transaction that still has one or more uncompleted operations—e.g., a transaction in which one updated account balance has been stored, but not yet both balances continuing with the example discussed above. As used herein, the phrase "committed database transaction" refers to a database transaction that is no longer active—i.e., all associated operations have completed.) The buffer data structure may be structured in a manner that enables efficient storage of key-value pairs for concurrently received transactions while also simplifying coherency control to ensure transaction isolation. (As used herein, the phrase "key-value pair" refers to the collection of a value of data and a corresponding key usable to determine where the value is stored (or is be stored) in a database system. For example, key-value pair might include the value $800 and a key indicating that the value is to be stored in an entry for a particular customer's account balance.)

As will be discussed, in various embodiments, the buffer data structure includes a hash table that organizes storage of key-value pairs based on their keys. That is, when a key-value pair is being written for a transaction, the key is used to index into the hash table (i.e., identify the appropriate entry in the table—referred to as a hash bucket) and append a record for the key-value pair to the hash bucket. As multiple records associated with the same or different transactions are appended for a given key, the records may be linked together to form a record chain for that key.

As concurrent database transactions are received, there is the potential for two or more transactions to operate on the same record chain simultaneously. In various embodiments, hash buckets are associated with respective latches that control access to their record chains in order to provide concurrency control for the record chains. (As used herein, the term "latch," "lock," and "semaphore" refer to a variable that controls access to a resource shared among multiple potential consumers.) Accordingly, if a transaction is attempting to write multiple key-value pairs, the transaction may acquire the corresponding latches of the hash buckets that correspond to the pairs' keys, and begin storing the values by appending records for the values to the appropriate record chains. If a subsequent transaction is received that attempts to modify one of the key-value pairs of the earlier transaction, the subsequent transaction may fail to acquire the hash-bucket latch for that key-value pair (as it may still be held by the earlier transaction) and thus be blocked until the latch can be acquired. In doing so, the later transaction is prevented from interfering with the earlier transaction, which could result in the erroneous storage of data. Once the earlier transaction completes its operation on a record chain, however, the latch may be released to the later transaction, so that it can begin storing its data. In many instances, using hatch-bucket latches significantly reduces the complexity of enforcing concurrency control for reading and writing data from the buffer data structure and reduces the potential for deadlock (i.e., the scenario in which two transactions are unable to complete their operations because both have acquired latches needed by the other).

In various embodiments, the buffer data structure also includes one or more additional structures used for various purposes such as an active transaction list and a skip list discussed below. Rather than rely on separate concurrency control mechanisms for these structures, these structures, instead, rely on the hash-bucket latches associated with the hash table in some embodiments. For example, if a modification is being performed to a record in the skip list, hash-bucket latches may be used to provide concurrency control and prevent the record from being access until after modification has completed. Thus, hash-bucket latches may be used not only for record-chain concurrency control, but also for concurrency control for other structures in the buffer data structure, which further simplifies concurrency management for the buffer data structure. Still further, these structures may maintain pointers usable to access the key-value records in the record chains. Rather than maintain direct pointers to these records, however, these structures may leverage the direct pointers that already exist within the hash buckets by having pointers to the corresponding hash buckets instead. If records of a record chain are later relocated, the direct pointer in the corresponding hash bucket is updated, but not the one to the hash bucket as its location remains the same. Leveraging the hash table in this manner to point indirectly to records can significantly simplify pointer management.

Turning now to FIG. 1, a block diagram of a database system 10 is depicted. In illustrated embodiment, database system 10 includes a transaction manager 104, buffer data structure 106, and a database 108. As shown, buffer data structures 106 includes multiple record chains 110, hash table 120, active transaction list 130, and skip list 140. Record chains 110 includes key-value records 112. Hash table 120 includes a hash function 122 and an array of a hash buckets 124, each including a latch 126. In some embodiments, database system 10 may be implemented differently than shown. For example, in some embodiments, buffer data structure 106 may include more (or less) structures.

Transaction manager 104, in one embodiment, includes program instructions that are executable to process received database transactions 102. In general, transactions 102 may be issued to read or write data to database 108 and may be received from any of various sources such as one or more client devices, application servers, software executing on database system 10, etc. As will be described in greater detail below, this processing may entail manager 104 initially storing records 112 for key-value pairs of transactions 102 in buffer data structure 106 until the records 112 can be flushed to the persistent storage of database 108. Accordingly, various functionality described below with respect to buffer data structure 106 may be implemented by transaction manager 104 such as adding key-value records 112 to record chains 110, facilitating acquisition of hash-bucket latches 126 for transactions 102, modifications to active transaction list 130 and skip list 140, etc.

Buffer data structure 106, in one embodiment, is a data structure that buffers key-value pairs for active transactions until the transactions commit. As will be described below, buffer data structure 106 is structured in a manner that allows for quick insertion of key-value pairs, which can be performed concurrently in some instances allowing for high volumes of transactions to be processed efficiently. Still further, buffer data structure 106 may reside in a local memory allowing for faster reads and writes than the persistent storage where database 108 may reside. In various embodiments, buffer data structure 106 allows concurrent modifications to be performed to it for different transactions 102, but provides a concurrency control mechanism via hash-bucket latches 126 for data within buffer data structure 106. In some embodiments, committed transaction data is asynchronously flushed from buffer data structure 106 to database 108. That is, rather than perform a flush for each transaction 102's data upon its commitment, a flush is performed periodically for multiple committed transactions 102. For example, in one embodiment, transaction manager 104 initiates a flush to database 108 in response to buffer data structure 106 satisfying a particular size threshold.

Database 108 may correspond to any suitable form of database implementation. In some embodiments, database 108 is a relational database that is implemented using a log-structured merge (LSM) tree have multiple layers. In some embodiments, portions of these layers may be distributed across multiple physical computer systems providing a persistent storage. In some embodiments, these computers systems are cluster nodes of a computer cluster that provides a cloud-based system accessible to multiple clients. In some embodiments, database 108 may be part of a software as a service (SaaS) model; in other embodiments, database 108 may be directly operated by a user.

As noted above, when transaction manager 104 stores a key-value pair for an active transaction 102 in buffer data structure 106, a corresponding key-value record 112 may be created that includes the value and the key. If multiple transactions 102 attempt to write values associated with the same key, key-value records 112 may be generated for each value and linked to together to form a record chain 110 corresponding to the key. For example, if a user has withdrawn a first amount from a bank account resulting in a first database transaction 102 and then a second amount resulting in a second database transaction 102, a record chain 110 corresponding to an account-balance key may have two key-value records 112 reflecting those withdrawals. In various embodiments, each record 112 includes a transaction identifier (e.g., a transaction sequence number) specifying its associated transaction 102; records 112 may also be organized in a record chain 110 based on the ordering in which the transactions 102 are received. For example, as described below with respect to FIG. 2, record chains 110 may be implemented using linked lists such that a new record 112 is inserted at the head of the linked list and migrates to the tail as newer records 112 are created and older ones are flushed to database 108. To facilitate quick access to key-value records 112, record chains 110 are appended to hash buckets 124 of hash table 120.

Hash table 120, in one embodiment, is a data structure that allows constant-time lookups of record chains 110 based on given a key. That is, when a key is received, hash table 120 is indexed into by applying hash function 122 to the key to produce the appropriate index value for the hash bucket 124 corresponding to the key. The direct pointer in the hash bucket 124 may then be referenced to obtain to the record chain 110. Being able to perform constant-time lookups may significantly reduce the time consumed to read key-value records 112, write records 112, or perform key probes (i.e., determining whether a key has a key-value record 112 present in buffer data structure 106).

As noted above, in various embodiments, each hash bucket 124 includes a respective latch 126 that controls access to its record chain 110. Accordingly, when a transaction is attempting to read or write a value associated with a particular key, the key may be used to index into hash table 120 and acquire the latch 126 corresponding to the key's associated hash bucket 124 before reading or writing is performed. If a latch 126 cannot be acquired for a database transaction 102, processing the database transaction 102 may be delayed until the latch 126 is released. In some embodiments, latches 126 may have one of three possible states: available, shared acquired, and exclusively acquired. If no transaction 102 is currently accessing a record chain 110, its latch 126 is available for acquiring. If a transaction 102 is performing a read of a key-value record 112, the latch 126 may be acquired in a shared state—meaning that other transactions 102 can also acquire the latch 126 as long as they are also performing a read (i.e., not attempting to modify a record 112 while it is also being read). If a transaction 102 is performing a write, however, the latch 126 is acquired for the transaction 102 in an exclusive state—meaning no other transaction 102 may acquire the latch 126 until it is released. Accordingly, if two transactions 102 are attempting to perform writes for the same key, the later transaction is delayed until the former completes its write operation and releases the latch 126. If a transaction 102 is attempting to access multiple key-values pairs, latches 126 may be acquired in ascending order of the keys to prevent deadlock. Although acquisition of latches 126 may be discussed primarily with respect to read and write operations, latches 126 may also be acquired when performing other operations such as defragmentation, garbage collection, flushing records 112 to database 108, etc. As noted, in some embodiments, latches 126 may also serve as a concurrency control mechanism for active transaction list 130 and skip list 140. Hash table 120 is described below in further detail with respect to FIG. 3

Active transaction list 130, in one embodiment, is a data structure that tracks various metadata for active transactions 102. In various embodiments, the metadata for a given transaction 102 includes a transaction identifier for the transaction 102 and one or more pointers usable to access records 112 associated with the transaction 102. In doing so, list 130 enables a transaction 102's records 112 to be identified based on its transaction identifier, which may be helpful when, for example, determining which records 112 should be removed if the transaction 102 is being rolled back. The metadata may also include an indication of whether a transaction is active or committed, which may be used to determine if its records 112 can be marked for flushing to database 108. As will be described in greater detail below with respect to FIG. 4, in some embodiments, active transaction list 130 includes indirect pointers for accessing records 112 from list 130. That is, rather than have direct pointers to records 112 (i.e., pointers specifying the memory addresses of records 112), list 130 includes indirect pointers to the hash buckets 124, which include the direct pointers to chains 110. Advantageously, if a new record 112 gets added to a record chain 110, the direct pointer in the hash bucket 124 is updated, not the indirect pointer in list 130. As noted above, in some embodiments, list 130 may also leverage hash-bucket latches 126. Accordingly, if a record 112 for a transaction 102 is being accessed through list 130 for modification or removal, a latch 126 may be acquired for the record 112's key to prevent other modifications from being performed.

Skip list 140, in one embodiment, is a data structure that maintains an ordering of keys in records 112 to allow forward and reverse scanning of keys. (As used herein, the phrase "skip list" is to be interpreted according to its understood meaning in the art, and includes a data structure that includes a linked hierarchy of sequences of data records, with each successive sequence skipping over fewer elements than the previous sequence.) In some embodiments, database 108 may be configured such that records 112 for committed transactions 102 are flushed in ascending key order (as well as version order); skip list 140 may allow this ordering to be quickly and easily determined. Similar to active transaction list 130, in some embodiments, skip list 140 may use indirect pointers to records 112 that leverage the direct pointers in hash buckets 124. As noted above, skip list 140 may also leverage latches 126 when modifications are performed to skip list 140. Although shown separately from records 112, portions of skip list 140, in some embodiments, may reside in records 112 as will be discussed with respect to FIG. 5.

Figure 2:
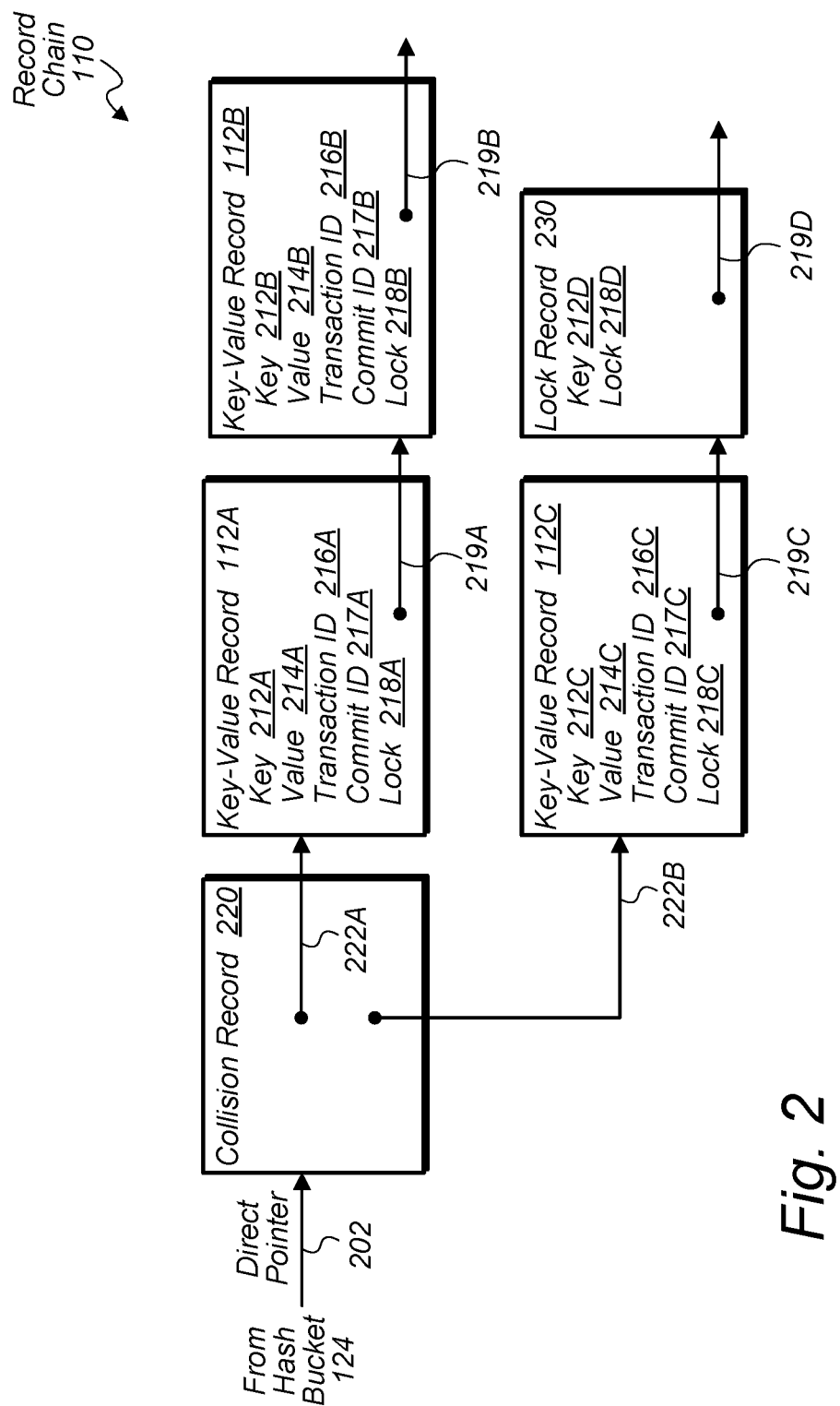
FIG. 2 is a block diagram illustrating one embodiment of a record chain within the buffer data structure.

Turning now to FIG. 2, a block diagram of a record chain 110 is depicted. As shown, record chain 110 may include a collection of key-value records 112A-112C, a collision record 220, and a lock record 230. Records 112 may further include a key 212, value 214, transaction identifier 216, commit identifier 217, lock 218, and pointer 219. In some embodiments, chain 110 may include more (or less) records 112, 220, or 230 than shown; a given record 112 may also include more (or less) elements 212-219 than shown.

In the illustrated embodiment, record chain 110 is implemented using a linked list such that each key-value record 112 includes a pointer 219 identifying the next record 112 in the chain 110. When a record 112 is added, it is inserted at the head identified by the direct pointer 202 in the hash bucket 124 or appended to a collision record 220 discussed below. The added record 112 may then include a pointer 219 to the record that was previously at the head. As the record 112 becomes older, it migrates toward the tail (record 112B or lock record 230 in FIG. 2) until its transaction 102 commits and it is flushed to database 108 and removed. A given record 112's transaction identifier 216 may identify, not only the transaction 102 to which the record 112 is associated, but also indicate the ordering in which transactions 102 were received. Accordingly, since record 112B is further from the head than record 112A, transaction ID 216B may correspond to an earlier transaction 102 than transaction ID 216A. If the transaction 102 corresponding to transaction ID 216B is to be rolled back, transaction manager 104 may locate record 112B by referencing direct pointer 202 to identify the head of chain 110 and traverse through records 112A and 220 until finding the record 112B having the corresponding transaction ID 216B. Record 112B may then be removed and pointer 222A modified to have the same address as pointer 219B. In some embodiments, if a transaction 102 commits, the commit identifiers 217 for its records 112 may be set to reflect the commitment and mark the record 112 as being ready for flushing to database 108. Records 112 may later be scanned by a process of transaction manager 104 to identify which records 112 have commit identifiers 217 and to determine which records 112 can be flushed to database 108.

In some embodiments, collision records 220 are used to append records 112 to chain 110 when two different keys (e.g., keys 212A and 214C) produce the same hash value (i.e., a hash collision occurs) and thus share the same hash bucket 124. In various embodiments, the size of hash table 120 is selected to have a sufficient number of hash buckets 124 in order to ensure a low likelihood of collision. If a hash collision occurs, however, a record 220 may be inserted including pointers 222 to records 112 having different keys 212. Although, in many instances, a hash-bucket latch 126 is specific to a single respective key 212, in such an event, the hash-bucket latch 126 would be associated with multiple, different keys 212.

As noted above, in some embodiments, individual records 112 may also include their own respective locks 218 to provide additional coherency control. In some embodiments, a separate lock record 230 may also be inserted into record chains 110 to create a lock tied to a particular key when there is no corresponding value. Use of locks 218 and record locks 230 are described in further detail in U.S. application Ser. No. 15/420,255 filed concurrently herewith entitled "DELEGATED KEY-LEVEL LOCKING FOR A TRANSACTIONAL MULTI-VERSION KEY-VALUE STORE", which is incorporated by reference herein in its entirety.

Figure 3:
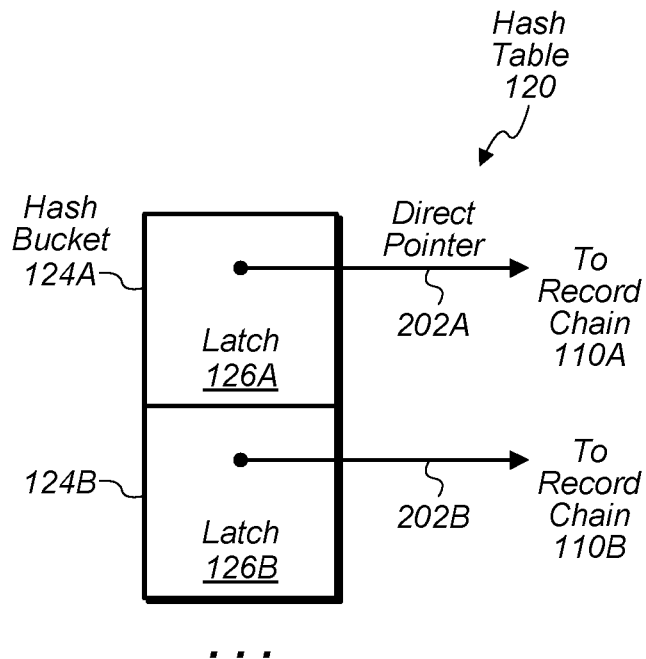
FIG. 3 is a block diagram illustrating one embodiment of a hash table within the buffer data structure.

Turning now to FIG. 3, a block diagram of hash table 120 is depicted. As noted above, in some embodiments, a given hash bucket 124 in hash table 120 includes a direct pointer 202 to the record chain 110 appended to that bucket 124. As noted above and discussed below, these pointers may be used not only to read and write records 112, but also to implement indirect pointers for active transaction list 130 and skip list 140. In various embodiments, a given bucket 124 may also include latch data for the latch controlling access to chain 110. For example, the hash bucket 124 may store the state of the latch along with an indication of what transaction holds the latch 126, in some embodiments. In another embodiment, however, a latch 126 may located outside of the hash bucket 124 for which it is associated.

Figure 4:
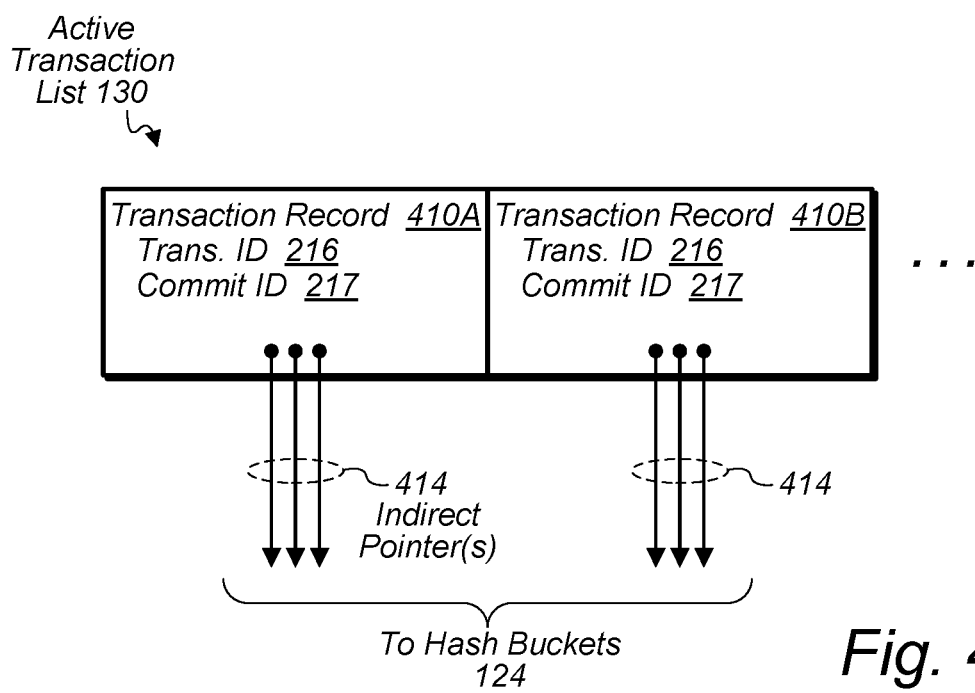
FIG. 4 is a block diagram illustrating one embodiment of an active transaction list within the buffer data structure.

Turning now to FIG. 4, a block diagram of active transaction list 130 is depicted. As noted above, in some embodiments, active transaction list 130 may be used to track various metadata for transactions 102 having key-value records 112 in buffer data structure 106. Accordingly, in the illustrated embodiment, active transaction list 130 includes a set of transaction records 410, which include a transaction ID 216, a commit ID 217, and one or more indirect pointers 414 to hash buckets 124. In some embodiments, list 130 may be implemented differently than shown in FIG. 4. Accordingly, more (or less) elements may be included in a given record 410 than shown such as one or more keys 212 associated with a transaction 102. Although depicted as being implemented using an array of records 410, in other embodiments, list 130 may be implemented using other types of data structures such as a linked list or a hash table that is indexed into based on a transaction identifier 216.

Transaction identifier 216, in one embodiment, is included to establish an association of a transaction 102 to its key-value records 112. As noted above, in various embodiments, this association may be used to determine which records 112 should be removed in the event that the transaction 102 is rolled back. This association may also be used to determine which records 112 can be marked for flushing to persistent storage in database 108 once the transaction 102 is committed. That is, in some embodiments, when a transaction 102 completes its operations, the commit identifier 217 in its transaction record 410 may be set. The record 410 may then be used to locate the corresponding records 112 and set their respective identifiers 217, which may indicate that they are ready for flushing to database 108.

Indirect pointers 414, in one embodiment, are included to allow a key-value record 112 to be accessed from list 130 without using a direct pointer to the record 112 or recalculating the hash value for accessing a hash bucket 124 by applying hash function 122 to a key 212. As noted above, using indirect pointers 414, which point to the hash buckets 124 including the direct pointers 202 to the corresponding record chains 110, greatly simplifies pointer management because only a direct pointer 202 is updated when the head of a record chain 110 is relocated. That is, since the location of the hash bucket 124 remains in the same, the indirect pointer 414 can be traversed to identify the bucket 124 with the direct pointer 202 identifying the new location of the head. In some embodiments, a given transaction record 410 includes an indirect pointer 414 for each record 112 associated with that record 410's transaction 102. In another embodiments, records 112 may be linked together using indirect pointers as they are inserted for a transaction 102. In such an embodiment, a given record 410 may include a single indirect pointer 414 to the last record 112 inserted for the transaction 102. If earlier inserted records 112 need to be accessed, the indirect pointer 414 may be traversed along with one or more indirect pointers in the linked records 112.

As noted above, in some embodiments, hash-bucket latches 126 may be used when particular operations are performed that use active transaction list 130. For example, if a transaction 102 has completed its operations, hash-bucket latches 126 may be acquired to set the commit identifier 217 in each of its key-value records 112. Latches 126 may also be acquired when list 130 is used to locate records 112 being removed as part of a transaction rollback.

Figure 5:
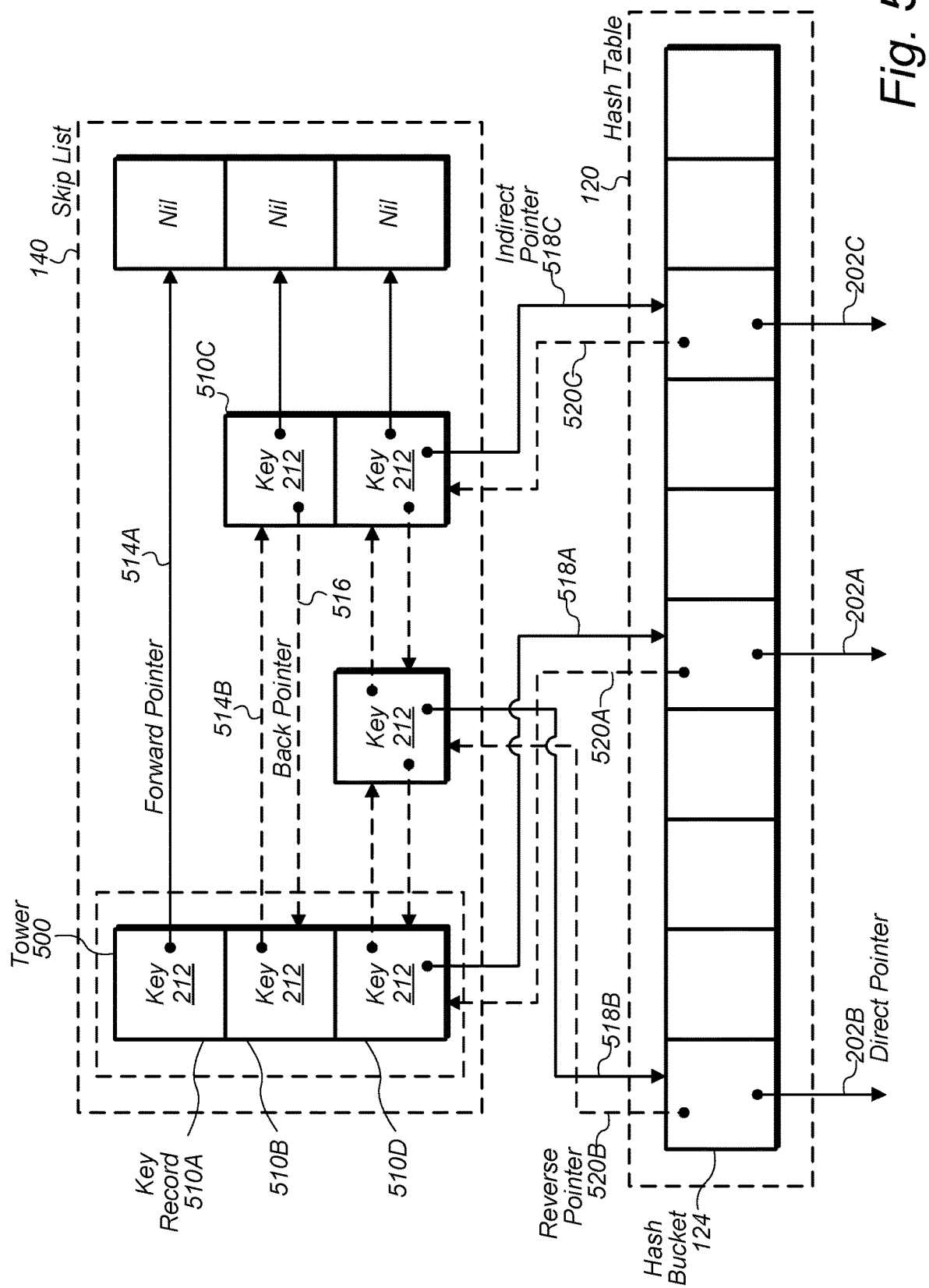
FIG. 5 is a block diagram illustrating one embodiment of a skip list within the buffer data structure.

Turning now to FIG. 5, a block diagram of skip list 140 is depicted. As noted above, in various embodiments, skip list 140 may be used to maintain an ordering of keys 212 stored in records 112, which may be used to flush records 112 of committed transactions 102 in ascending key order. In the illustrated embodiment, skip list 140 includes a collection of key records 510 pertaining to keys 212 within records 112. In such an embodiment, records 510 may be sorted based on ordering of keys 212 and placed into towers 500 if the key records 510 pertain the same key 212.

When a particular key 212 is being searched in skip list 140 to identify the next key 212 in ascending or descending order, traversal of skip list 140 may begin, in the illustrated embodiment, at key record 510A, where the key 212 in record 510A is compared against the key being searched. If there is a match, traversal proceeds to the bottom record 510D in the tower 500. If the key 212 in the record is less than the key 212 being searched, the forward pointer 514A is examined to determine whether it points to another record 510 or does not point to any address (i.e., points to Nil). If it does point to another record 510, traversal proceeds to the other record. If it points to Nil, traversal proceeds to the next record 510B in the tower 500. This traversal process continues to repeat in the same manner until a match is identified or no match is found. If a match is identified for a key 212 in a record 510, the pointers 514 and 516 in the lowest record 510 in that record's tower 500 may be examined to determine the records 510 for the next key 212 in ascending or descending order.

In some embodiments, a given tower 500 (or the lowest record 510 within the tower 500) may include a pointer usable to access the record chain 110 corresponding to that tower 500's key 212. That is, rather than include a direct pointer, the tower 500, in the illustrated embodiment, includes an indirect pointer 518 to the hash bucket 124, which includes the direct pointer 202 to that record chain 110. In some embodiments, however, a given tower 500 is specific not only to a particular key 212 but also a particular transaction 102, and thus may be collocated with the corresponding record 112 for that key and that transaction 102. In such an embodiment, forward pointers 514 and backward pointers 516 may not be implemented as direct pointers as shown by the dotted lines in FIG. 5, but rather as a combination of indirect pointers 518 and direct pointers 202, which may correspond to reverse pointers 520 as they point back to the records 112 including the towers 500. For example, forward pointer 514B from key record 510B to record 510C may be implemented by storing the indirect pointer 518C in record 510B and relying on direct pointer 202C, which corresponds to reverse pointer 520C pointing back to record 510C. As noted above, use of indirect pointers 518 may reduce the number of updated pointers if a record 112 or record chain 110 is relocated. Use of indirect pointers in a skip list is described in greater detail in U.S. application Ser. No. 15/420,342 filed concurrently herewith entitled "KEY-VALUE STORAGE USING A SKIP LIST", which is incorporated by reference herein in its entirety.

As noted above, in some embodiments, skip list 140 may rely on hash-bucket latches 126 for concurrency control. For example, if a particular tower 500 is being removed because there is no longer a record 112 corresponding to its key 212, the pointers in the adjacent towers 500 may need to be updated, so that they do not point to the tower 500 being removed and instead point to one another. In order to perform this modification, in some embodiments, hash-bucket latches 126 may be acquired that correspond to the keys 212 of the tower 500 being removed as well as the two adjacent towers 500. These latches 126 may then be held until the pointers can be updated.

Figure 6A:
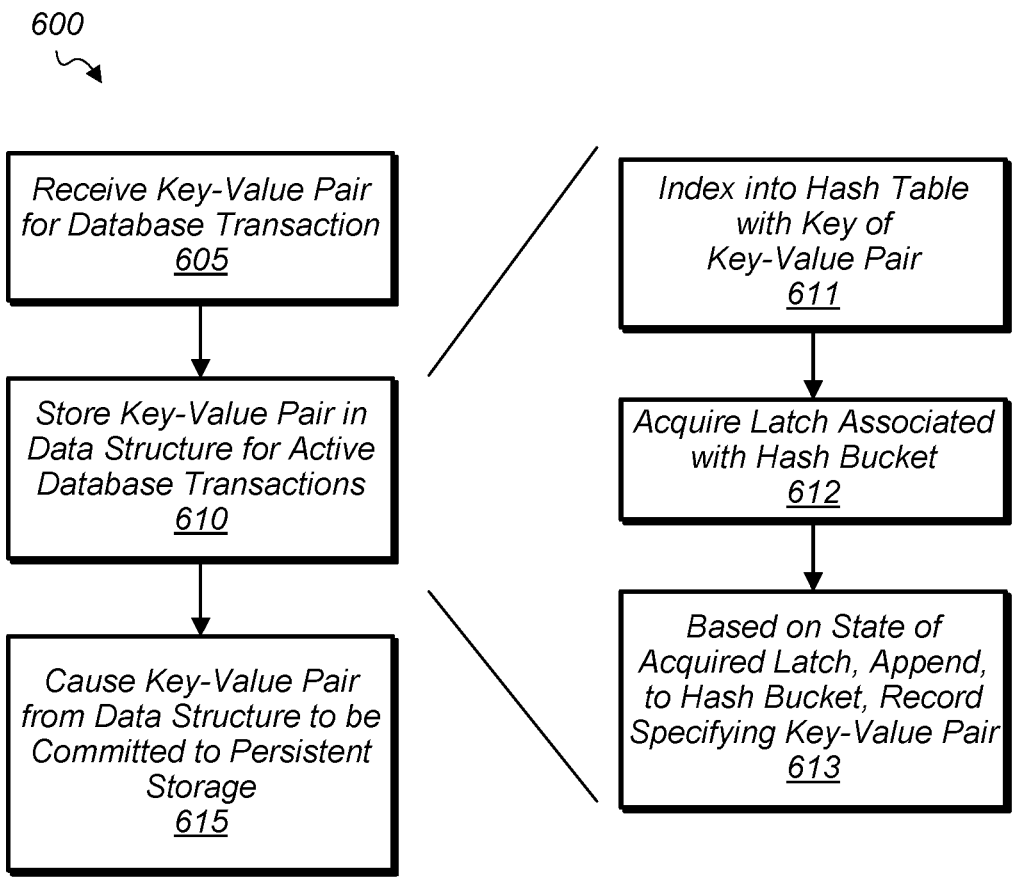
FIGS. 6A-6C are flow diagrams illustrating embodiments of methods related to processing concurrent transactions.

Turning now to FIG. 6A, a flowchart of a method 600 for storing a value of a key-value pair is depicted. In one embodiment, method 600 is performed by a computing system, such as database system 10, attempting to process a database transaction. In some instances, performance of method 600 may reduce the potential for algorithmic deadlocks when providing concurrency control for a data structure used to buffer data for active transactions.

In step 605, a key-value pair for a database transaction (e.g., a transaction 102) is received. In some embodiments, this key-value pair is received from a client device interfacing with the computing system. In some embodiments, this key-value pair is generated by software executing on the computing system.

In step 610, the key-value pair is stored in a data structure for active database transactions (e.g., buffer data structure 106). In various embodiments, step 610 includes, at substep 611, indexing into a hash table (e.g., hash table 120) of the data structure with a key of the key-value pair to identify a hash bucket (e.g., bucket 124) of the hash table corresponding to the key; at substep 612, acquiring a latch (e.g., latch 126) associated with the identified hash bucket; and, at substep 613, based on a state of the acquired latch, appending, to the hash bucket, a record (e.g., a key-value record 112) specifying the key-value pair. In some embodiments, the hash bucket includes a pointer (e.g., pointer 202) to a linked list of records (e.g., record chain 110) appended to the hash bucket. In such an embodiment, the records include key-value pairs corresponding to different database transactions associated with the key, and the records are arranged in the linked list based on an ordering of the database transactions. In some embodiments, the hash table includes a plurality of hash buckets, each including a respective latch. In some embodiments, step 610 further includes storing a pointer (e.g., an indirect pointer 414) in one of the set of records (e.g., a transaction record 410) corresponding to the first database transaction, the pointer identifying the hash bucket identified in substep 611 and being usable to access the record specifying the first key-value pair.

In step 615, the key-value pair from the data structure is caused to be committed to persistent storage in response to the database transaction being committed.

In various embodiments, method 600 includes performance of additional operations. In some embodiments, method 600 includes receiving a second key-value pair for a second database transaction, the second key-value pair including the key of the key-value pair in step 605. In such an embodiment, method 600 further includes indexing into the hash table of the data structure with the key of the second key-value pair to identify the hash bucket and, in response to determining that the latch associated with the hash bucket is acquired, delaying storage of the second key-value pair in the data structure. In some embodiments, the data structure includes a skip list (e.g., skip list 140) that maintains an ordering of keys for key-value pairs stored in the data structure. In one embodiment, method 600 includes, in response to determining to modify an entry in the skip list associated with the key of the key-value pair, acquiring the latch associated with the hash bucket and, based on a state of the acquired latch, modifying the entry in skip list. In some embodiments, method 600 includes traversing the skip list to identify another key that comes before or after the key of the key-value pair in the ordering, including accessing, in the skip list, a first pointer (e.g., an indirect pointer 518) that identifies a hash bucket corresponding to the other key and accessing, in the hash bucket corresponding to the other key, a second pointer (e.g., a direct pointer 202) that identifies a linked list having a record including the other key.

Figure 6B:
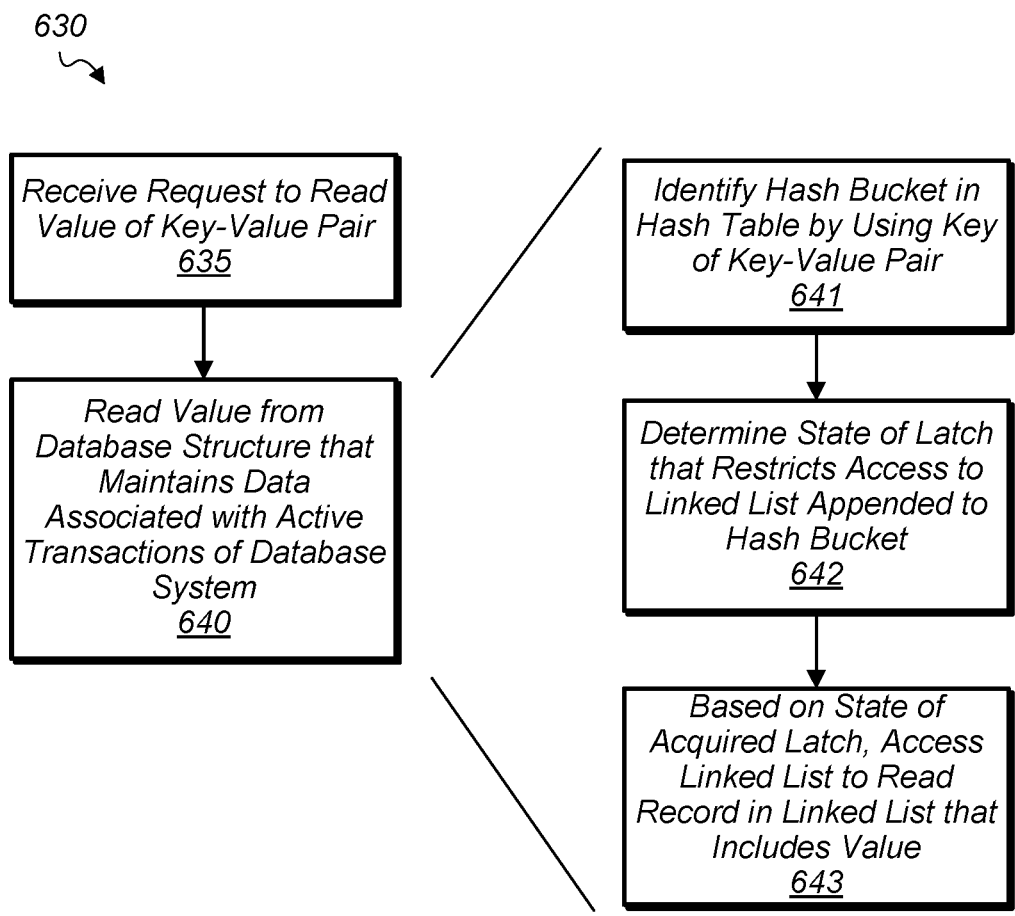

Turning now to FIG. 6B, a flowchart of a method 630 for reading a value of a key-value pair is depicted. In one embodiment, method 630 is performed by a computing system, such as database system 10, attempting to process a database transaction. In some instances, performance of method 630 may reduce the potential for algorithmic deadlocks when providing concurrency control for a data structure used to buffer data for active transactions.

In step 635, a request is received to read a value of a key-value pair associated with a database transaction. In some embodiments, this key-value pair is received from a client device interfacing with the computing system. In some embodiments, this key-value pair is generated by software executing on the computing system.

In step 640, the value is read from a database structure (e.g., buffer data structure 106) that maintains data associated with active transactions of a database system. In various embodiments, the reading includes, at substep 641, identifying a hash bucket in a hash table by using a key of the key-value pair to index into the hash table; at subset 642, determining a state of a latch that restricts access to a linked list appended to the hash bucket; and, at substep 643, based on the state of the latch (e.g., being either shared or available), accessing the linked list to read a record in the linked list that includes the value. In some embodiments, the determining includes accessing data stored in the hash bucket (e.g., data for a latch 126). In some embodiments, the linked list includes a plurality of records (e.g., records 112) that include key-value pairs corresponding to the key and corresponding to different transactions. In such an embodiment, the latch controls access to the plurality of records in the linked list.

In various embodiments, method 630 includes performance of additional operations. Accordingly, in some embodiments, method 630 includes receiving a second request to read a second value of a second key-value pair, the second key-value pair including the key and being associated with another database transaction. Method 630 may further include reading the second value from the database structure, including determining that the latch is acquired and that the state of the latch is a shared state and, based on the state of the latch being the shared state, accessing the linked list to read a record in the linked list that includes the second value. In some embodiments, method 630 includes receiving a second request to write a second value of a second key-value pair that includes the first key of the first key-value pair (i.e., the same key), and in response to the second request, determining that the latch is acquired in a shared state and delaying servicing the second request until the latch is acquirable in an exclusive state.

In some embodiments, method 630 includes identifying a predecessor key or a successor key of the key of the first key-value pair in a key ordering by accessing a skip list (e.g., skip list 140) of the database structure, the skip list maintaining the key ordering for key-value pairs in the database structure. In some embodiments, method 630 further includes determining to remove, from the skip list, a record (e.g. a record 510) corresponding to the key of the first key-value pair, and in response, acquiring latches of hash buckets corresponding to the key of the first key-value pair, the predecessor key, and the successor key, and removing the record including modifying records in the skip list that correspond to the predecessor key and the successor key. In some embodiments, method 630 includes storing a record (e.g., record 410) for the database transaction in an array for active database transactions, the record identifying the key-value pair as being associated with the database transaction and including a pointer (e.g., an indirect pointer 414) that identifies the hash bucket and is usable to access the key-value pair (e.g., via a direct pointer 202). In such an embodiment, method 630 includes changing a location of the linked list and, in response to the changed location, updating a second pointer (e.g., the direct pointer 202) in the hash bucket to identify the changed location such that the first pointer is not updated in response to the changed location. In some embodiments, method 630 further includes, prior to receiving the first request, receiving a second request to store the first key-value pair and, in response to determining that the key of the first key-value pair does not have a record in the database structure, acquiring latches of hash buckets corresponding to the key of the first key-value pair, the predecessor key, and the successor key, appending, to the hash bucket, a record specifying the first key-value pair, and modifying records in the skip list that correspond to the predecessor key and the successor key to add a record for the key of the first key-value pair to the skip list.

Figure 6C:
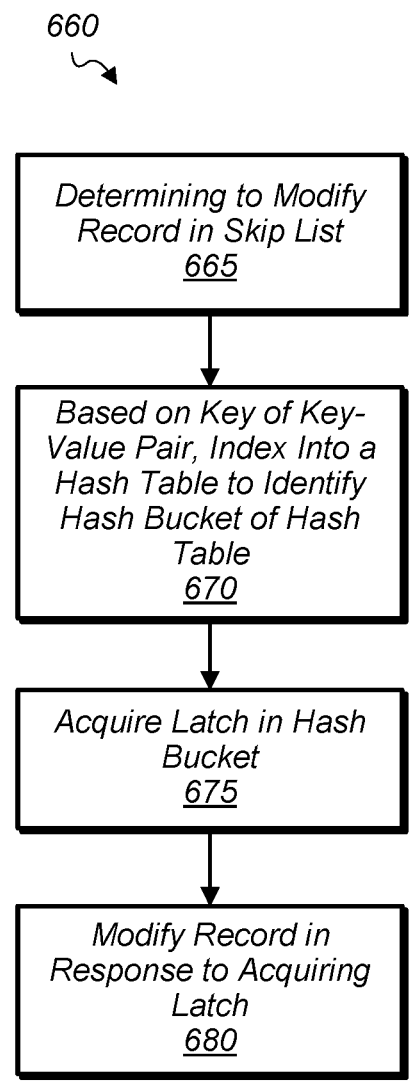

Turning now to FIG. 6C, a flowchart of a method 660 for modifying a record in a skip list is depicted. In one embodiment, method 660 is performed by a computing system, such as database system 10, attempting to process a database transaction. In some instances, performance of method 660 may reduce the potential for algorithmic deadlocks when providing concurrency control for a data structure used to buffer data for active transactions.

Method 660 begins in step 665 with determining to modify a record in a skip list (e.g., skip list 140) that maintains an ordering of keys for key-value pairs stored in a data structure (e.g., buffer data structure 106) that maintains key-value pairs for active database transactions. In such an embodiment, the record (e.g., key record 510) is usable to identify a predecessor key or a successor key for a particular key of a key-value pair. In step 670, a hash table (e.g., hash table 120) of the data structure is indexed into based on the particular key of the key-value pair to identify a hash bucket of the hash table. In step 675, a latch is acquired in the hash bucket, the latch restricting use of the hash bucket. In step 680, the record is modified in response to acquiring the latch.

Exemplary Computer System

Figure 7:
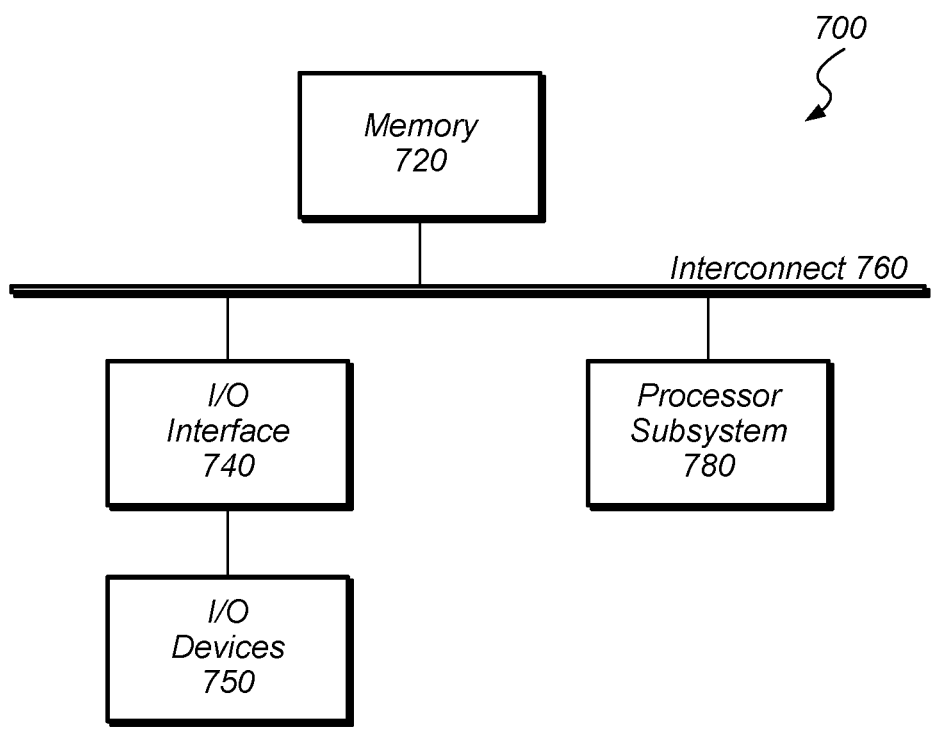
FIG. 7 is a block diagram illustrating one embodiment of an exemplary computer system.

Turning now to FIG. 7, a block diagram of an exemplary computer system 700, which may implement functionality described herein, such as computing system 10, a portion of computing system 10, or a client interacting with system 10, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together in a cluster.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780 to cause system 700 to perform operations described herein. In some embodiments, memory 720 may include transaction manager 104, buffer data structure 106, and/or portions of database 108.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for storing data in a data structure for a plurality of active database transactions of a computer system for use in association with a persistent storage for a database system for database transactions by the computer system, the method comprising:
   storing, at the computer system, a key-value pair for a database transaction in the data structure for active database transactions, wherein the storing includes:
      indexing into a hash table of the data structure by applying a hash function to a key of the key-value pair to identify a hash bucket of the hash table corresponding to the key;
      acquiring a latch associated with the identified hash bucket, the latch having one or a plurality of values; and
      depending on a value of the acquired latch, appending to a linked list of the hash bucket, a record specifying the key of the key-value pair, a value of the key-value pair, and a transaction identifier for the database transaction, wherein the transaction identifier is usable to identify other appended records as belonging to the same database transaction as the appended record;
   linking the appended record to another record in the data structure by including, in the other record, a pointer to the identified hash bucket; and
   causing the key-value pair and key-value pairs of the other appended records to be committed from the data structure to the persistent storage if the database transaction is to be committed, wherein the key specified in the record is usable by the database system to determine where to store the value of the key-value pair in the persistent storage.

2. The method of claim 1, wherein the hash table includes a plurality of hash buckets each including a respective latch operable to control access to a respective linked list appended to that hash bucket.

3. The method of claim 1, wherein the other record is one of a plurality of records that associate transaction identifiers of the active database transactions to key-value pairs associated with the active database transactions.

4. A non-transitory computer readable medium having program instructions stored thereon that are capable of causing a computing system to implement operations comprising:
   receiving a first key-value pair for a first database transaction, wherein the first key-value pair includes a first value and a first key usable to locate the first value in persistent storage;
   storing the first key-value pair in a data structure for active database transactions, wherein the storing includes:
      indexing into a hash table of the data structure by applying a hash function to the first key of the first key-value pair to identify a hash bucket of the hash table corresponding to the first key;
      acquiring a latch associated with the identified hash bucket; and
      based on a state of the acquired latch, appending, to the hash bucket, a record specifying the first key of the first key-value pair, the first value of the first key-value pair, and a transaction identifier for the first database transaction, wherein the transaction identifier is specified by other records in the data structure to identify the other records as belonging to the same database transaction as the appended record;
linking the appended record to another record in the data structure by including, in the other record, a pointer to the identified hash bucket;
causing the first key-value pair and key-value pairs of the other records belonging to the same database transaction to be committed from the data structure to the persistent storage in response to the first database transaction being committed.

5. The computer readable medium of claim 4, wherein the hash bucket includes a pointer to a linked list of records appended to the hash bucket, wherein records appended to the linked list include key-value pairs corresponding to different database transactions associated with the first key, and wherein the records appended to the linked list are arranged in the linked list based on an ordering of the database transactions; and
wherein the hash table includes a plurality of hash buckets, each including a respective latch.

6. The computer readable medium of claim 4, wherein the operations further comprise:
receiving a second key-value pair for a second database transaction, wherein the second key-value pair includes the first key of the first key-value pair;
indexing into the hash table of the data structure with the first key of the second key-value pair to identify the hash bucket; and
in response to determining that the latch associated with the hash bucket is acquired, delaying storage of the second key-value pair in the data structure.

7. The computer readable medium of claim 4, wherein the data structure includes a set of records for database transactions having key-value pairs in the data structure, wherein the records in the set indicate whether the database transactions have been committed; and
wherein storing the first key-value pair in the data structure includes storing a pointer in one of the set of records corresponding to the first database transaction, wherein the pointer identifies the identified hash bucket and is usable to access the record specifying the first key-value pair.

8. The computer readable medium of claim 4, wherein the data structure includes a skip list that maintains an ordering of keys for key-value pairs stored in the data structure.

9. The computer readable medium of claim 8, wherein the operations further comprise:
in response to determining to modify an entry in the skip list associated with the first key of the first key-value pair, acquiring the latch associated with the hash bucket; and
based on a state of the acquired latch, modifying the entry in skip list.

10. The computer readable medium of claim 8, wherein the operations further comprise:
traversing the skip list to identify a second key that comes before or after the first key of the first key-value pair in the ordering, wherein the traversing includes:
accessing, in the skip list, a first pointer that identifies a hash bucket corresponding to the second key; and
accessing, in the hash bucket corresponding to the second key, a second pointer that identifies a linked list having a record including the second key.

11. A non-transitory computer readable medium having program instructions stored thereon that are capable of causing a computing system to implement operations comprising:
receiving a first request to read a first value of a first key-value pair associated with a database transaction; and
reading the first value from a database structure that maintains data associated with active transactions of a database system, wherein the reading includes:
identifying a hash bucket in a hash table by applying a hash function a first key of the first key-value pair to index into the hash table;
determining a state of a latch that restricts access to a linked list appended to the hash bucket; and
based on the state of the latch, accessing the linked list to read a record in the linked list that includes the first value, the first key, and a transaction identifier of the database transaction, wherein the transaction identifier is usable to identify other records in the database structure as belonging to the same database transaction as the record in the linked list; and
in response to committing the database transaction, committing the first key-value pair and key-value pairs of the other records from the database structure to a persistent storage of the database system.

12. The computer readable medium of claim 11, wherein the linked list includes a plurality of records that include key-value pairs corresponding to the first key, wherein the key-value pairs correspond to different transactions, and wherein the latch controls access to the plurality of records in the linked list.

13. The computer readable medium of claim 11, wherein the operations further comprise:
receiving a second request to read a second value of a second key-value pair, wherein the second key-value pair includes the first key and is associated with another database transaction;
reading the second value from the database structure, including:
determining that the latch is acquired and that the state of the latch is a shared state; and
based on the state of the latch being the shared state, accessing the linked list to read a record in the linked list that includes the second value.

14. The computer readable medium of claim 11, wherein the operations further comprise:
receiving a second request to write a second value of a second key-value pair that includes the first key of the first key-value pair;
in response to the second request:
determining that the latch is acquired in a shared state; and
delaying servicing the second request until the latch is acquirable in an exclusive state.

15. The computer readable medium of claim 11, wherein the operations further comprise:
identifying a predecessor key or a successor key of the first key of the first key-value pair in a key ordering by accessing a skip list of the database structure, wherein the skip list maintains the key ordering for key-value pairs in the database structure.

16. The computer readable medium of claim 15, wherein the operations further comprise:
determining to remove, from the skip list, a record corresponding to the first key of the first key-value pair;

in response to determining to remove the record from the skip list:
    acquiring latches of hash buckets corresponding to the first key of the first key-value pair, the predecessor key, and the successor key; and
    removing the record including modifying records in the skip list that correspond to the predecessor key and the successor key.

17. The computer readable medium of claim 15, wherein the operations further comprise:
    prior to receiving the first request, receiving a second request to store the first key-value pair;
    in response to determining that the first key of the first key-value pair does not have a record in the database structure:
        acquiring latches of hash buckets corresponding to the first key of the first key-value pair, the predecessor key, and the successor key;
        appending, to the hash bucket, a record specifying the first key-value pair; and
        modifying records in the skip list that correspond to the predecessor key and the successor key to add a record for the first key of the first key-value pair to the skip list.

18. The computer readable medium of claim 11, wherein the operations further comprise:
    storing a record for the database transaction in an array for active database transactions, wherein the record identifies the first key-value pair as being associated with the database transaction, and wherein the record includes a first pointer that identifies the hash bucket and is usable to access the first key-value pair;
    changing a location of the linked list; and
    in response to the changed location, updating a second pointer in the hash bucket to identify the changed location, wherein the first pointer is not updated in response to the changed location.

19. A non-transitory computer readable medium having program instructions stored thereon that are capable of causing a database system to implement operations comprising:
    determining to modify a record in a skip list that maintains an ordering of keys for key-value pairs stored in a data structure that maintains the key-value pairs for active database transactions, wherein the record is usable to identify a predecessor key or a successor key for a particular key of a key-value pair associated with a database transaction;
    based on the particular key of the key-value pair, indexing into a hash table of the data structure to identify a hash bucket of the hash table by applying a hash function to the particular key of the key-value pair;
    acquiring a latch in the hash bucket, wherein the latch restricts use of the hash bucket;
    modifying the record in response to acquiring the latch, wherein the record includes the particular key, a value of the key-value pair, and a transaction identifier of the database transaction, and wherein the transaction identifier is usable to identify other records in the data structure as belonging to the same database transaction as the modified record; and
    in response to committing the database transaction, committing the key-value pair and key-value pairs of the other records from the data structure to a persistent storage of the database system, wherein the particular key included in the record is usable by the database system to determine where to store the value of the key-value pair in the persistent storage.

* * * * *

UNITED STATES PATENT AND TRADEMARK OFFICE
CERTIFICATE OF CORRECTION

PATENT NO. : 11,386,065 B2
APPLICATION NO. : 15/420377
DATED : July 12, 2022
INVENTOR(S) : Fanghaenel et al.

It is certified that error appears in the above-identified patent and that said Letters Patent is hereby corrected as shown below:

In the Claims

In Column 15 (Claim 4), Lines 9, please delete "hash bucket;" and insert -- hash bucket; and --.

Signed and Sealed this
Sixteenth Day of August, 2022

Katherine Kelly Vidal
Director of the United States Patent and Trademark Office